United States Patent [19]

Bukhshtaber et al.

[11] 4,424,478
[45] Jan. 3, 1984

[54] DEVICE FOR EXCITING MASTER GENERATOR OF SELF-CONTAINED POWER UNITS FOR TRANSPORTATION FACILITIES

[76] Inventors: Eliazar Y. Bukhshtaber, 9 Parkovaya, 47, korpus 1, kv. 37; Jury M. Andreev, Nagatinskaya, 15, korpus 1, kv. 53; Mikhail P. Askinazi, Trifonovskaya ulitsa, 60, korpus 2, kv. 73; Anatoly D. Mashikhin, ulitsa Marshala Timoshenko, 28, kv. 45; Egor P. Plotnikov, Stavropolskaya ulitsa, 54, korpus 2, kv. 34; Vitaly I. Anders, ulitsa Gorkogo, 6, kv. 281, all of Moscow, U.S.S.R.

[21] Appl. No.: 223,048

[22] Filed: Jan. 7, 1981

[51] Int. Cl.³ .......................... H02P 9/14; H02P 9/30
[52] U.S. Cl. ........................................ 322/63; 322/59; 322/86
[58] Field of Search ............................ 322/59, 63–66, 322/79, 44, 86

[56] References Cited

U.S. PATENT DOCUMENTS 4,032,835  6/1977  Finnell et al. .................... 322/59 X
4,336,486  6/1982  Gorden et al. ....................... 322/63

Primary Examiner—R. J. Hickey
Attorney, Agent, or Firm—Myron Greenspan; Burton L. Lilling; Bruce E. Lilling

[57] ABSTRACT

A device for exciting a master generator of self-contained power units for transportation facilities comprises a master generator with a first excitation winding, an auxiliary exciter generator with a second excitation winding, an exciting current regulator, and an independent d-c source. One of the leads of the first excitation winding of the master generator is electrically coupled to a respective d-c lead of the auxiliary exciter generator through its second excitation winding connected accordantly in series with the first excitation winding of the master generator.

5 Claims, 8 Drawing Figures

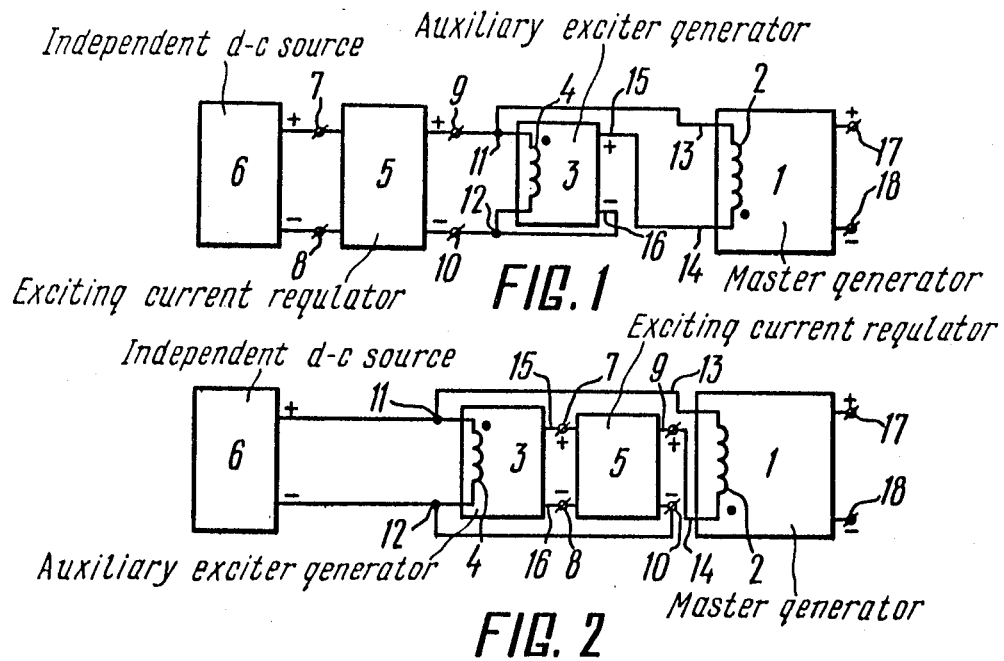
FIG. 1
FIG. 2
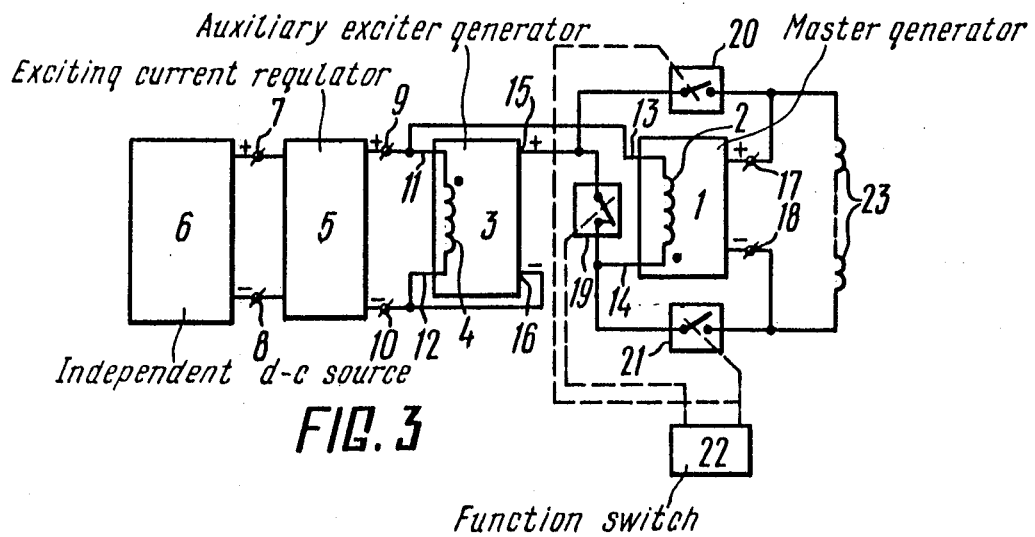
FIG. 3

DEVICE FOR EXCITING MASTER GENERATOR OF SELF-CONTAINED POWER UNITS FOR TRANSPORTATION FACILITIES

FIELD OF THE INVENTION

The present invention relates to electrical engineering and supply of self-contained power units and in particular to a device for exciting a master generator of self-contained power units of transportation facilities.

The invention may be used for exciting master generators of diesel locomotives, diesel-electric motor-car sections, and heavy-freight dump trucks. It is also suitable for use with other units wherein a master generator is to be excited under traction and electrical deceleration conditions.

PRIOR ART

Known in the art is a device for exciting a master generator of self-contained power units for transportation facilities (cf. Lectra Haul Unit Rig and Equipment Co. Tulsa, Okla. Electrical Manual M200, Post Office box 3107, Tulsa, Okla. 74101, pp. 1.11–1.15, FIGS. 1-26, 1-27, 3-1).

The aforesaid device comprises a master generator with an excitation winding, an auxiliary exciter generator with an excitation winding and d-c leads, an independent d-c source whose poles are coupled to the excitation winding of the auxiliary exciter generator to permit exciting current flow from the independent d-c source, and an exciting current regulator, the inputs of which are connected to the d-c leads of the excitation winding of the auxiliary exciter generator and whose outputs of said regulator are coupled to the leads of the excitation winding of the master generator.

In such a device constant power $P_1$ consumed from the independent d-c source for exciting the auxiliary exciter generator is determined solely by voltage $U$ of the independent d-c source and effective resistance $R$ of the excitation winding of the auxiliary exciter generator:

$$P_1 = U^2/R \qquad (1)$$

This power does not depend on the operating conditions of the master generator. It is determined in designing a given power unit with due account taken of possible forcing conditions encountered in exciting the master generator at which the power required to excite the master generator may exceed by several times the power needed to effect excitation in the rated and continuous operating modes. The above factor substantially increases the capacity of the independent d-c source and the power consumed therefrom.

Also known in the art is a device for exciting a master generator of self-contained power units for transportation facilities (cf. Komatsu booklet ND 1200-1.E "Dump Truck (Electrical Equipment)", Komatsu, Ltd., Japan, Russian language publication, 12-76.00201, FIG. 01-8, pp. 1–18; FIG. 01-12, pp. 1–23).

The foregoing device comprises a master generator with an excitation winding, an auxiliary exciter generator with an excitation winding and d-c leads, an exciting current regulator, and an independent d-c source whose poles are coupled to the inputs of the exciting current regulator, the outputs of which are connected to the leads of the excitation winding of the auxiliary exciter generator whose d-c leads are coupled directly to the leads of the excitation winding of the master generator.

In such a device power $P_2$ consumed from the independent d-c source for exciting the auxiliary exciter generator is proportional to exciting current $I$ of the master generator:

$$P_2 = K \cdot I \qquad (2)$$

This power is, on an average, much smaller than the power $P_1$ in formula (1) for the previously mentioned device. However, in designing a particular power unit it is necessary to increase capacity of the independent d-c source, especially under forced conditions at great excitation currents, a limitation appreciably increasing the capacity of the independent d-c source.

In the aforesaid device residual voltage is reduced by shorting the output terminals of the master generator connected to the rectifier by the use of an additional contactor (short circuitor) before electrical deceleration, the master generator being partially demagnetized due to armature reaction at open-circuit current. Series resistors are placed in the circuit of the excitation windings to limit initial exciting current of traction motors under electrical deceleration conditions.

The changeover to deceleration causes rapid wear of rectifiers of a rectifier unit at the output of the master generator and also of its stator windings due to electric shocks during the shorting procedure.

BRIEF DESCRIPTION OF THE INVENTION

It is an object of the present invention to provide a device for exciting a master generator of power units for transportation facilities, which permits decreasing current drain from an independent d-c source under traction conditions and, in effect, reducing required capacity thereof.

Another object of the invention is to provide a device allowing demagnetization of an excitation system of a master generator in changing over to electrical deceleration.

A further object of the invention is to increase control range of the master generator.

A still another object of the invention is to enhance operational reliability of the device.

One more object of the invention is to increase electrical safety in operation of the device. The foregoing and other objects of the invention are accomplished by that in a device for exciting a master generator of self-contained power units for transportation facilities comprising a master generator with an excitation winding, an auxiliary exciter generator with an excitation winding and d-c leads, an independent d-c source whose poles are electrically coupled to leads of the excitation winding of the auxiliary exciter generator to permit exciting current flow from the independent d-c source, and an exciting current regulator electrically coupled to the auxiliary exciter generator and to the independent d-c source, leads of the excitation winding of the master generator being electrically coupled to the respective d-c leads of the auxiliary exciter generator, according to the invention, electrical connection between one of the leads of the excitation winding of the master generator and the respective d-c lead of the auxiliary exciter generator is accomplished through its excitation winding connected accordingly in series with the excitation winding of the master generator so that current from the exciter generator flows through the excitation winding of the exciter generator in the same direction as the exciting current from the independent d-c source.

In the hereinproposed device electrical connection between the poles of the independent d-c source and the leads of the excitation winding of the auxiliary exciter generator is preferably accomplished through the exciting current regulator by connecting its input terminals with the poles of the independent d-c source, electrically coupling the other lead of the excitation winding of the master generator to the other d-c lead of the auxiliary exciter generator, and interconnecting the leads of its excitation winding and the output terminals of the exciting current regulator.

It is advantageous that, in the device according to the invention, the input terminals of the exciting current regulator should be connected with the respective d-c leads of the exciter generator. Desirably one output terminal of the regulator is directly connected with the other lead of the excitation winding of the master generator, while the other output terminal of the regulator is coupled to the respective pole of the independent d-c source whose other pole should be connected with one of the leads of the excitation winding of the exciter generator, which is coupled to one lead of excitation winding of the master generator, the other lead of the excitation winding of the exciter generator being connected with the respective pole of the independent d-c source.

The device preferably includes one normally closed switching element and two normally open switching elements, said switching elements being controlled by a power unit function switch, electrical connection between the other lead of the excitation winding of the master generator comprising d.c. output terminals and the other d-c lead of the auxiliary exciter generator being accomplished through the normally closed switching element, each lead of said switching element being connected with the respective output terminal of the master generator through the respective normally open switching element.

The device advantageously includes a current limiter inserted between the other lead of the excitation winding of the master generator and the respective pole of the independent d-c source connected with the other lead of the excitation winding of the exciter generator.

The device in compliance with the invention includes additional current paths feeding the excitation winding of the auxiliary exciter generator, an advantage appreciably reducing current drain from the independent d-c source under traction conditions.

Furthermore, the device forming the subject of the present invention incorporates additional circuits designed to demagnetize the excitation system of the master generator, which is necessary in transferring from traction conditions to electrical deceleration.

Another advantage of the hereinproposed device over the prior art is that the control range during electrical deceleration is increased due to the provision of a current feedback circuit at the output of the master generator.

The utilization of additional paths for current from the independent d-c source enabling demagnetization of the excitation system of the master generator enhances reliability and electrical safety of the device.

BRIEF DESCRIPTION OF DRAWINGS

The invention will now be described further with reference to specific embodiments thereof, taken in conjunction with the accompanying drawings, wherein:

FIG. 1 is a block diagram of a device for exciting a master generator of self-contained power units for transportation facilities, according to the invention, with an exciting current regulator inserted between an independent d-c source and an excitation winding of an auxiliary exciter generator;

FIG. 2 is a block diagram of another embodiment of the device with the exciting current regulator connected to the leads of the d.c. exciter generator according to the invention;

FIG. 3 is a block diagram of the device of FIG. 1, featuring a demagnetization circuit operating from the master generator, according to the invention;

DETAILED DESCRIPTION OF THE INVENTION

Figure 4:
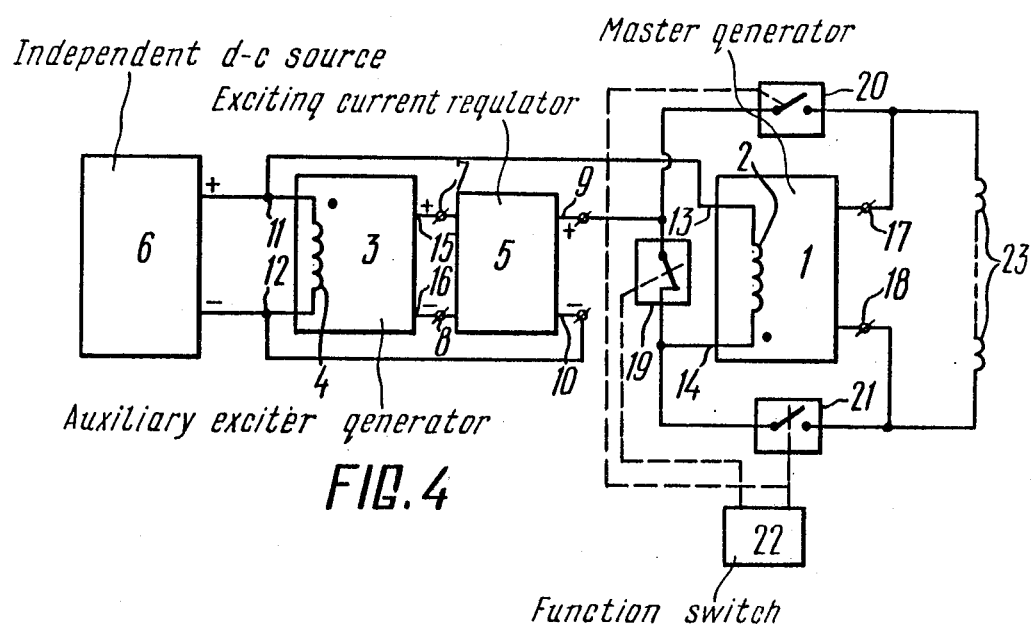
FIG. 4 is a block diagram of the device of FIG. 2 featuring a master generator demagnetization circuit, according to the invention.

The device for exciting a master generator of self-contained power units for transportation facilities comprises a master generator 1 (FIG. 1) with an excitation winding 2, an auxiliary exciter generator 3 with an excitation winding 4, an exciting current regulator 5, and an independent d-c source 6 whose poles or terminals are connected with input terminals 7 and 8 of the exciting current regulator 5.

Output terminals 9, 10 of the regulator 5 are, respectively, connected with a first lead 11 and a second lead 12 of the excitation winding 4 of the exciter generator 3.

The lead 11 of the excitation winding 4 is connected with a first lead 13 of the excitation winding 2 of the master generator 1, a second lead 14 thereof being connected with a d-c lead 15 of the exciter generator 3 whose lead 16 is connected with the lead 12 of the excitation winding 4.

The master generator 1 is provided with d-c leads 17 and 18.

The embodiment shown in FIG. 2 is peculiar in that the exciting current regulator 5 is coupled via its input terminals 7, 8 to the d-c leads 15, 16 of the exciter generator 3.

The lead 9 of the regulator 5 is connected with the lead 14 of the winding 2 of the master generator 1, while the lead 10 of the regulator 5 is connected with the lead 12 of the excitation winding 4 of the exciter generator 3 and with the respective pole of the independent d-c source 6 whose other pole is connected with a common tap between the lead 11 of the excitation winding 4 and the lead 13 of the excitation winding 2.

FIG. 3 is a block diagram of the device shown in FIG. 1 and designed for operation both in the traction and electrical deceleration modes.

Inserted between the lead 14 (FIG. 3) of the excitation winding 2 of the master generator 1 and the lead 15 of the exciter generator 3 is a switching element 19 which is closed under traction conditions and open when electrical deceleration occurs.

A switching element 20 is inserted between the lead 15 of the exciter generator 3 and the lead 17 of the master generator 1, while a switching element 21 is placed between the lead 14 of the excitation winding 2 of the master generator 1 and its lead 18.

The switching elements 20 and 21 are open throughout the traction mode and closed in transferring to the electrical deceleration mode.

The switching elements 19, 20 and 21 are controlled by a function switch 22.

Excitation windings 23 of traction motors are connected to the leads 17, 18 of the master generator 1 during electrical deceleration.

Turning now to FIG. 4 the device shown in FIG. 2 additionally incorporates the switching elements 19, 20 and 21 controlled by the function switch 22 and connected essentially as in the diagram of FIG. 3.

Such a circuit configuration is advantageous in the case when the exciter generator 3 represents a d-c machine.

Figure 5:
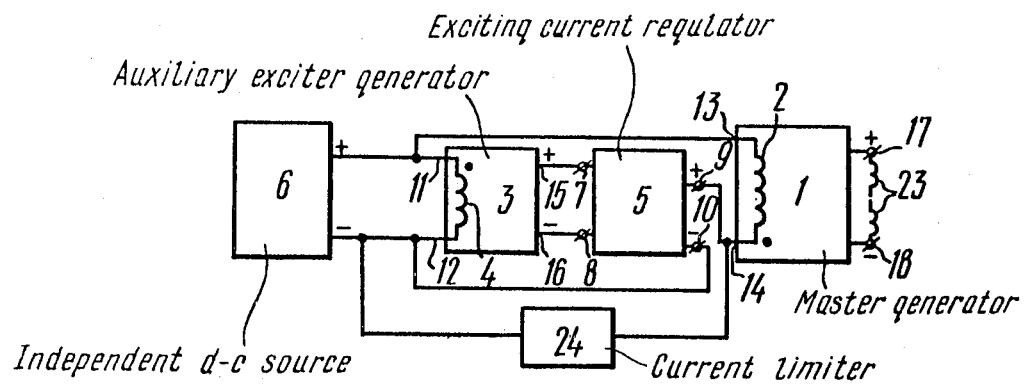
FIG. 5 is a block diagram of the device of FIG. 2, according to the invention, featuring a demagnetization circuit operating from an independent d.c. source.

FIG. 5 is a block diagram of the device shown in FIG. 2 and designed for operation both in the traction and deceleration modes featuring a demagnetization circuit operating from the independent d.c. source 6.

This is done by inserting a current limiter 24 between one of the poles of the independent d-c source 6 (FIG. 5) connected with the lead 12 of the winding 4 and the lead 14 of the excitation winding 2 of the master generator 1.

Figure 6:
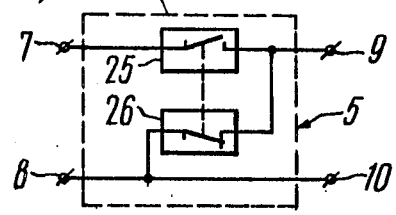
FIG. 6 is a block diagram of the exciting current regulator depicted in the diagram of FIG. 1 according to the invention.

Referring to FIG. 6 illustrating a block diagram of the exciting current regulator 5 used with the device depicted in FIG. 1 there are provided a switch 25 placed between the terminals 7, 9 and a switch 26 placed between the terminals 8, 9. The leads 8 and 10 are directly connected to each other. The switches 25 and 26 may be open simultaneously or closed at different times.

The circuit of the exciting current regulator 5 depicted in FIG. 2 with the auxiliary exciter generator 3 representing a d-c machine or an a-c machine with an uncontrolled rectifier contains at the output a fully controllable quick-operate switch 27 (FIG. 7) bypassed by a diode 28 connected in opposition. The switch 27 is placed in the conducting direction between the terminals 7 and 9, while a bypass diode 29 is placed in the conducting direction between the terminals 10 and 9. The terminals 8 and 10 are directly connected to each other.

When the exciter generator 3 (FIG. 2) represents an a-c machine with a controlled rectifier, the exciting current regulator 5 and the exciter generator 3 employ a single circuit 30 (FIG. 8), the function of the regulator 5 being performed by a controlled rectifier unit 31 incorporating noncontrolled diodes 32, controlled rectifiers 33, and a bypass diode 34 connected in the conducting direction between the terminals 10 and 9.

The number of the diodes 32 and the rectifiers 33 connected as a bridge is equal to the number of the phases of an armature winding 35 of the auxiliary exciter generator 3.

Figure 9:
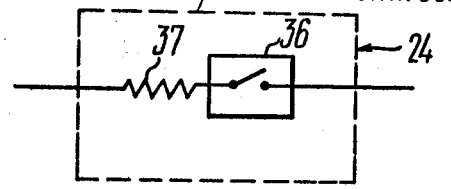
FIG. 9 illustrates one embodiment of the current limiter depicted in the diagram of FIG. 4, according to the invention.
Figure 10:
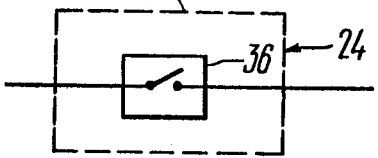
FIG. 10 illustrates another embodiment of the current limiter depicted in the diagram of FIG. 4, according to the invention.
Figure 11:
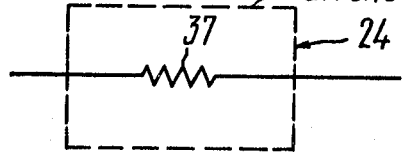
FIG. 11 illustrates a third embodiment of the current limiter depicted in the diagram of FIG. 4, according to the invention.

The current limiter 24 depicted in the diagram of FIG. 5 may comprise such series-connected components as a controlled switch 36 (FIG. 9) and a resistor 37. In another embodiment of the invention it may include either the controllable switch 36 (FIG. 10) or the resistor 37 (FIG. 11).

Figure 12:
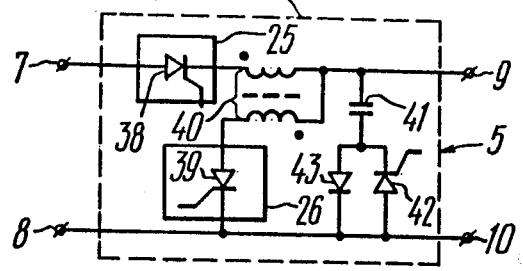
FIG. 12 is a circuit diagram of the exciting current regulator depicted in FIG. 5 with single-action mutually switchable thyristors, according to the invention.

The circuit of the exciting current regulator 5 (FIG. 6) depicted in FIG. 12 includes single-action thyristors 38 and 39 incorporating a mutual switching circuit composed of a two-winding choke 40, a switching capacitor 41, an additional thyristor 42, and a diode 43, said single-action thyristors acting as the switches 25 and 26.

The windings of the choke 40 are connected accordantly in series with the common point connected with one of the plates of the capacitor 41 and with the output terminal 9.

The start lead of the first winding of the choke 40 is connected with the cathode of the single-action thyristor 38 whose anode is connected with the input terminal 7. The finish lead of the winding of the choke 40 is connected with the anode of the single-action thyristor 39 whose cathode is coupled to the electrically interconnected terminals 8 and 10. The second plate of the capacitor 41 is coupled to the terminals 8 and 10 through the inversely parallel thyristor 42 and the diode 43, the interconnected cathode of the thyristor 42 and anode of the diode 43 being connected with the second plate of the capacitor 41.

The operating principle of the hereinproposed device for exciting a master generator of self-contained power units for transportation facilities essentially consists in the following.

Exciting current is supplied from the independent d-c source 6 (FIG. 1) through the regulator 5 across the excitation winding 4 of the auxiliary exciter generator 3, the current flow being from the lead 11 to the lead 12. The excitation of the auxiliary exciter generator 3 results in the appearance and rise of voltage across the output leads 15 and 16. As a result, the exciting current of the master generator 1 begins to flow from the lead 15 to the lead 11 through the winding 2 and then through the winding 4 to the lead 16. At the winding 4 said exciting current is added to the current furnished by the independent d-c source 6 and regulated by the regulator 5. This increase of the exciting current at the winding 4 leads to a further rise of voltage across the output terminals 15 and 16 of the exciter generator 3, said increase being continued until the parameter under test (current across the excitation winding 2 or voltage and current at the output of the master generator 1) complies with the setting signal and the exciting current regulator 5 decreases the current across the winding 4 of the exciter generator 3.

The following relationships may exist between direct current $I_2$ flowing across the excitation winding 2 of the master generator 1 and acting as a load current for the exciter generator 3, and exciting current $I_4$ flowing across the excitation winding 4 with the same voltage at the output terminals 15, 16 and load current:

(1) $I_2 < I_4$, in this case $I_4 = I_2 + I_5$      (3)

where $I_5$=current flowing through the output terminals 9 and 10 of the regulator 5 from the independent d-c source 6;

(2) $I_2 \geq I_4$      (4)

In both cases no current from the independent d-c source 6 will be consumed as the output voltage is kept at a constant level.

To maintain the output voltage at a constant level at $I_2 > I_4$ or reduce it accordingly in both cases, the current $I_5'$ flowing through the regulator 5 should be $$I_5' = I_2 - I_4 \quad (5)$$

Said current should be part of the current $I_2$.

Thus, at $I_2 < I_4$ any suitable regulator, say a series element, may act as the exciting current regulator 5 for the device shown in FIG. 1.

At $I_2 > I_4$ the exciting current regulator 5 should be a series-parallel regulator shown in FIG. 6.

Activating the completing switch 25 connects the independent d-c source 6 (FIG. 1) to the excitation winding 4.

The current $I_4$ across the winding 4 increases as it is the sum of the currents $I_2$ and $I_5$:

$$I_4 = I_2 + I_5 \quad (6)$$

With the switch 25 (FIG. 6) being constantly activated, the voltage will increase until the magnetic system of the exciting generator 3 (FIG. 1) is saturated or the switch 25 (FIG. 6) is turned off.

If $I_2 < I_4$, a voltage drop will result from the turn-off of the switch 25.

If the bypass switch 26 turns on simultaneously with the turn-off of the switch 25, the output voltage across the leads 15 and 16 (FIG. 1) of the exciter generator 3 will decrease regardless of the relationships existing between the currents $I_2$ and $I_4$.

From the aforesaid it follows that the regulator 5 is operated by alternately changing over the switches 25 and 26 (FIG. 6).

When the regulator 5 uses the noncontact quick-operate switches 25 and 26, such switches may represent fully controllable rectifiers, say, double-action thyristors.

At the present time due to the absence of high-power double-action thyristors and high cost and inadequate reliability of the existing double-action thyristors, it is possible to use conventional single-action thyristors using an artificial switching circuit.

FIG. 12 illustrates one of the embodiments of the regulator 5 using single-action thyristors.

The thyristor 38 acting as the switch 25 turns on at the beginning of operation when the output voltage of the master generator 1 (FIG. 1) is small (below the setting value).

The capacitor 41 is charged from the positive pole (FIG. 1) of the independent d-c source 6 through the terminal 7, the thyristor 38 (FIG. 12), the first winding of the choke 40 and then through the diode 43 and the terminal 8.

The voltage to which the capacitor 41 may be charged will, in some instances, exceed the voltage of the independent source 6 (FIG. 1) due to the presence of the diode 43.

The thyristors 39 (FIG. 12) and 42 will turn on after the parameter under test (exciting current $I_2$ or voltage and current at the output of the master generator 1) exceeds the setting value. The charged capacitor 41 will then be connected to the second winding of the choke 40. The opposing current will flow through the thyristor 38 due to magnetic coupling between the windings of the choke 40 whereby the thyristor 38 will turn off. Such a condition is possible when the source 6 (FIG. 1), say, a battery possesses reverse conductance. Otherwise, a capacitor should be placed at the output of the source 6 or between the input terminals 7, 8 of the regulator 5.

After the thyristor 38 (FIG. 12) turns off, the capacitor 41 is charged further up to the reverse voltage peak value. Thereafter the direction of current changes and another cycle involving charging through the diode 43 begins. As this happens, the current will increase again.

Simultaneously, the excitation winding 4 (FIG. 1) of the auxiliary exciter generator 3 is bypassed whereby a portion of the current $I_2$ bypassing the winding 4 flows over the circuit from the terminal 9 through the second winding of the choke 40 (FIG. 12), the thyristor 39, and the terminal 10. Hence, $$I_4 = I_2 - I_5 \quad (7)$$

When the charging current of the capacitor 41 flowing through the diode 43 exceeds the current $I_4$, the thyristor 39 turns off whereby the residual voltage of the capacitor 41 will be applied to the winding 4 (FIG. 1). This will result in a further decrease of the current at the winding 4, voltage at the output leads 15, 16 and the exciting current of the master generator 1.

As the parameter under test decreases below the setting value, the thyristor 38 (FIG. 12) turns on again, and the excitation winding 4 (FIG. 1) is reconnected to the independent d-c source 6.

Further operation of the device is similar to the above-described procedure. However, if after the turn-off of the thyristor 39 (FIG. 12) the parameter under test does not decrease to a level below the setting value, the thyristor 39 turns on again as the capacitor 41 is charged to the peak value due to the action of a portion of the current $I_2$. If the thyristor 42 fails to turn on, the capacitor 41 will remain charged. In this case, the thyristor 39 may remain in the conducting state as long as the parameter under test decreases below the setting value.

When the setting value is reached, the thyristor 42 turns on, the capacitor 41 is charged through the thyristors 39, 42 and the voltage thereat increases to the peak value although its polarity is reversed. Next, the capacitor 41 is charged in the opposite direction through the diode 43, thus rendering the thyristor nonconductive.

After the turn-off of the thyristor 39, the thyristor 38 turns on, if the parameter under test is below the setting value, and the thyristor 39 turns on, if said parameter again increases beyond the setting value. Neither of the thyristors 38, 39 will turn on, if the parameter under test fully complies with the setting value.

The aforesaid regulator 5 may be used with any generator 3 (FIG. 1) regardless of the relationship existing between the currents $I_2$ and $I_4$.

Due to the fact that the thyristor 38 (FIG. 12) (switch 25 of FIG. 6 in the general case) is nonconductive most of the time, and no current is consumed from the independent source 6 (FIG. 1) for exciting the exciter generator 3, especially at $I_2 > I_4$, power requirements and, consequently, the capacity of the independent source 6 may be considerably reduced, which is an apparent advantage over the prior art.

When the hereinproposed device (FIGS. 3 and 4) is utilized for exciting the master generator 1 of self-contained power units installed on various electrically decelerated vehicles, the switching element 19 is closed and the switching elements 20, 21 are open under traction conditions.

Under deceleration conditions when the element 19 is open and the elements 20, 21 are closed, the output leads 17, 18 with excitation windings 23 of the traction motors inserted therebetween are connected, respectively, to the lead 15 of the exciter generator 3 and to the lead 14 of the excitation winding 2 of the master generator 1.

The elements 19 to 21 are changed over by the use of the function switch 22 which also controls other elements accomplishing switching operations in the power circuit in transferring from one operating mode to the other.

Under electrical deceleration conditions the residual voltage at the leads 17, 18 of the master generator 1 (voltage remaining after maximum exciting current has passed through the winding 2, said current being subsequently minimized to zero) is fed to the series-connected windings 2 and 4 so that the induced current flows in the direction opposite to that of the magnetizing current.

Consequently, the excitation systems of the master generator 1 and the exciter generator 3 will be simultaneously demagnetized before electrical deceleration occurs, the demagnetization of the master generator 1 being accomplished to a greater extent due to the appearance of negative voltage at the output terminals 15, 16 with a d-c machine serving as the exciter.

When the exciter generator 3 represents an a-c machine with a rectifier, a special closing means (not shown in the drawings) is connected to the leads 15, 16 said means representing a series bypass resistor or a special shorting circuit with a transistor or rectifier switch which turns on as the voltage between the leads 15, 16 is close to zero or at a higher voltage existing between the leads 14 and 15.

The output voltage of the master generator 1 applied to the windings 23 between the leads 15 and 14 results in application of constant tight traction-motor exciting-current feedback to the windings 23 over the entire deceleration period, which permits regulating the exciting current of the master generator 1 by the use of the regulator 5 under deceleration conditions without decreasing the exciting-current control range.

With the exciting current regulator 5 placed at the output of the exciter generator 3, as shown in FIG. 2, use may be made of the regulator depicted in FIG. 12 or of any other suitable regulator 5.

Figure 7:
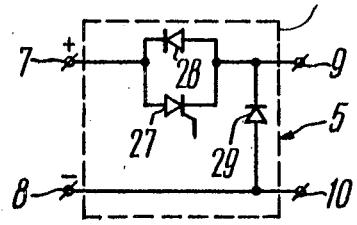
FIG. 7 is a circuit diagram of the exciting current regulator depicted in the diagram of FIG. 2 with the auxiliary exciter generator representing a d-c machine or an a-c machine with an uncontrolled rectifier, according to the invention.

If the exciter generator 3 is a d-c machine or an a-c machine with a rectifier, the regulator 5 may use the circuitry of FIG. 7.

The current control is effected by the use of the fully controllable quick-operate switch 27 which may represent a double-action thyristor or a conventional single-action thyristor employing an artificial switching circuit. The bypass diode 29 is used to permit current flow due to the energy stored by the inductors of the excitation windings 2 and 4 as the switch 27 turns off.

The diode 28 passes the demagnetizing current under deceleration conditions when the device shown in FIG. 4 includes the exciter generator 3 representing a d-c machine.

With the exciting current regulator 5 (FIG. 2) placed at the output of the exciter generator 3, the voltage at the terminals of the independent d-c source 6 is chosen so that the current flowing therefrom to the leads 11 and 12 is sufficient to produce such an initial voltage across the output leads 15 and 16 of the exciter generator 3 at which the controlled rectifiers of the regulator 5 are turned on reliably. After the rectifiers of the regulator 5 are turned on and current appears at the excitation winding 2 of the master generator 1, the current across the winding 4 will increase being the sum of $$I_4 = I_2 + I_6 \qquad (8)$$

where $I_6$ = current flowing from the independent d-c source 6.

As the exciting current $I_2$ at the winding 2 of the master generator 1 increases due to a voltage drop at the winding 4, the current $I_6$ consumed from the independent source 6 will decrease, said current being determined from the formula $$I_6 = (U_6 - I_2 \cdot R_4)/R_4 \qquad (9)$$

where
$U_6$ = voltage across the terminals of the independent source 6 provided that its internal resistance is zero; and
$R_4$ = effective resistance of the excitation winding 4 of the exciter generator 3.

At $I_2$ when $I_2 \cdot R_4 \geq U_6$ no current is consumed from the independent source 6. The source 6 may consume the current in the event of reverse conductance and the possibility of charging when the condition $I_2 \cdot R_4 > U_6$ is satisfied.

Since the current drain from the source 6 occurs only until the condition $I_2 \cdot R_4 < U_6$ is encountered and decreases with increasing current, power $P_6$ of the independent source 6 will be determined from the condition $$P_6 = U^2{}_6/R_4 \qquad (10)$$

Said power is used only at the initial instant and decreases to zero during the operation of the exciter generator 3.

When the exciter generator 3 is an a-c machine with a rectifier at its output (not shown in the drawing), a special closing means should be connected to the leads 15 and 16, said means representing a series bypass resistor or a special shorting circuit incorporating a transistor of thyristor switch which turns on as the voltage across the leads 15 and 16 gets close to zero or at a higher feedback voltage taken from the leads 14 and 15.

Figure 8:
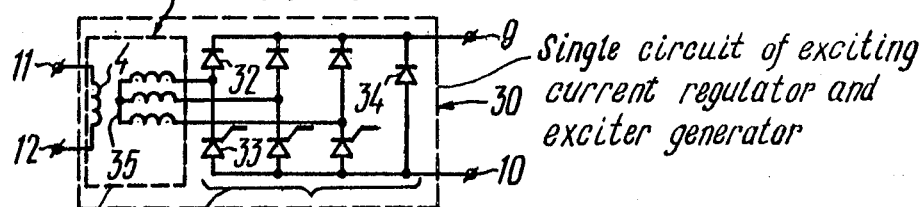
FIG. 8 is a circuit diagram of the exciter generator and the exciting current regulator depicted in the diagram of FIG. 2 with the auxiliary exciter generator representing an a-c machine with a controlled rectifier, according to the invention.

With the circuit 30 of FIG. 8 under deceleration conditions a closing means should be connected to the output terminals 9 and 10 to permit passage of demagnetizing current in the device similar to that shown in FIG. 4.

The circuit of FIG. 5 may be utilized when the device of FIG. 2 is used for exciting a master generator of self-contained power units installed on various electrically decelerated vehicles, especially if the circuit 30 (FIG. 8) is used as the exciter generator 3 featuring the regulator 5. In this case the independent d-c source 6 is used to demagnetize the excitation system of the master generator 1.

In transferring from traction conditions to electrical deceleration the exciting current regulator 5 (or the circuit 30 of FIG. 8 substituting for the exciter generator 3 with the exciting current regulator 5) is turned off, and the current at the excitation winding 3 (FIG. 5) of the master generator 1 is minimized to zero.

The provision of an additional circuit coupling the lead 14 to the negative terminal of the independent d-c source 6 through the current limiter 24 permits demagnetizing current to flow through the excitation winding 2 of the master generator 1 (from the positive terminal of the independent source 6 to the lead 13 of the winding 2 and from its lead 14 through the current limiter 24 to the negative terminal of the independent source 6).

Depending on the relationship between the current $I_{2(-)}$ required for demagnetization of the master generator and the voltage $U_6$ at the terminals of the independent source 6, the current limiter 24 may comprise the series-connected resistor 37 and the controllable switch 36 (FIG. 9) representing a contactor or a relay activated in transferring to the electrical deceleration mode.

If the demagnetizing current $I_{2(-)}$ is determined by the formula $I_{2(-)} = U_6/R_2$, the current limiter 24 should include one controllable switch 36 (FIG. 10) conducting at the instants the switch 27 (FIG. 7) of the current regulator 5 or any of the rectifiers 33 (FIG. 8) comprised in the circuit 30 is turned on. In this case, the use of quick-operate switch 36 (FIG. 10) is preferable. So, it may comprise controlled rectifiers.

The switch 36 should be turned on each time the switch 27 (FIG. 7) of the regulator 5 or all controlled rectifiers 33 (FIG. 8) of the circuit 30 is turned off, when the excitation current in the circuit of the windings 2, 4 (FIG. 5) exceeds the setting value.

When the resistance $R_{37} \geq 5R_2$, the switching element 36 (FIG. 9) may be emitted. Here the current limiter 24 will include only the current-limiting resistor 37 (FIG. 11).

The device arranged as in the diagram of FIG. 5 permits substantially simpler electrical circuit. It is more reliable and safe due to connection to the independent d.c. source 6 during deceleration.

What is claimed is:

1. A device for exciting a master generator of self-contained power units for transportation facilities comprising:
    a master generator with output terminals;
    a first excitation winding of said master generator with leads;
    an auxiliary exciter generator with d-c leads electrically coupled to said leads of said first excitation winding of said master generator;
    a second excitation winding of said auxiliary exciter generator with leads;
    an independent d-c source whose poles are electrically coupled to said leads of said second excitation winding of said auxiliary exciter generator to permit exciting current flow from said independent d-c source;
    an exciting current regulator electrically coupled to said auxiliary exciter generator and to said independent d-c source;
    the first of said leads of said first excitation winding of said master generator electrically coupled to the first of said d-c leads of said auxiliary exciter generator through its second excitation winding connected in series with said auxiliary first excitation winding of said master generator so that current from said exciter generator flows through said second excitation winding of said auxiliary exciter generator in the same direction as said exciting current from said independent d-c source.

2. A device as claimed in claim 1 comprising:
    said exciting current regulator accomplishing said electrical connection between said poles of said independent d-c source and said leads of said second excitation winding of said auxiliary exciter generator;
    input terminals of said exciting current regulator connected with said poles of said independent d-c source;
    output terminals of said exciting current regulator connected with said leads of said second winding of said auxiliary exciter generator;
    the second of said leads of said first excitation winding of said master generator electrically coupled to the second of said d-c leads of said auxiliary exciter generator.

3. A device as claimed in claim 1 comprising:
    said exciting current regulator accomplishing said electrical connection between said d-c leads of said auxiliary exciter generator and said leads of said first excitation winding of said master generator;
    input terminals of said exciting current regulator connected with the respective d-c leads of said auxiliary exciter generator;
    a first output terminal of said exciting current regulator connected with the second of said leads of said first excitation winding of said master generator;
    a second output terminal of said exciting current regulator connected with the first of said poles of said independent d-c source;
    the second of said poles of said independent d-c source connected to the first of said leads of said second excitation winding of said auxiliary exciter generator connected with the first of said leads of said first excitation winding of said master generator;
    the second of said leads of said second excitation winding of said auxiliary exciter generator connected with the first of said poles of said independent d-c source.

4. A device as claimed in claim 2 which comprises:
    a normally closed switching element controlled by a function switch of said power unit and accomplishing electrical connection between the second of said leads of said first excitation winding of said master generator and the second of said d-c leads of said auxiliary exciter generator;
    a first normally open switching element controlled by said function switch of said power unit and inserted between the first lead of said normally closed switching element and the first of said output terminals of said master generator;

a second normally open switching element controlled by said function switch of said power unit and inserted between a second lead of said normally closed switching element and the second of said output terminals of said master generator.

5. A device as claimed in claim 3 which comprises:
a current limiter inserted between the second of said leads of said first excitation winding of said master generator and the first of said poles of said independent d-c source connected to the second of said leads of said second excitation winding of said auxiliary exciter generator.

* * * * *